United States Patent [19]

Handley

[11] Patent Number: 5,231,687
[45] Date of Patent: Jul. 27, 1993

[54] TERMINATION SYSTEM FOR OPTICAL FIBRES

[75] Inventor: Graham R. Handley, Wirral, England

[73] Assignees: BICC PLC, London; Corning Limited, Sunderland, both of England

[21] Appl. No.: 711,049

[22] Filed: Jun. 3, 1991

[30] Foreign Application Priority Data

Jun. 4, 1990 [GB] United Kingdom ............... 9012421
Dec. 12, 1990 [GB] United Kingdom ............... 9027004

[51] Int. Cl.⁵ ............................................. G02B 6/26
[52] U.S. Cl. ...................................... 385/139; 385/55; 385/59; 385/60; 385/66; 385/78; 385/84; 385/135; 385/138
[58] Field of Search ...................... 385/53, 56, 60, 66, 385/76, 78, 84, 135, 137, 138, 139, 147; 254/134.4

[56] References Cited

U.S. PATENT DOCUMENTS

| | | | |
|---|---|---|---|
| 4,640,576 | 2/1987 | Eastwood et al. | 385/111 |
| 4,669,802 | 6/1987 | Schaffer | 439/535 |
| 4,708,430 | 11/1987 | Donaldson et al. | 385/135 |
| 4,796,970 | 1/1989 | Reeve et al. | 385/109 |
| 4,840,449 | 6/1989 | Ghandeharizadeh | 385/135 |
| 4,875,753 | 10/1989 | Kalomiris | 385/56 |
| 4,884,863 | 12/1989 | Throckmorton | 385/135 |
| 4,912,615 | 3/1990 | Blueband | 361/428 |
| 4,976,510 | 12/1990 | Davila et al. | 385/53 |
| 5,071,211 | 12/1991 | Debortoli et al. | 385/76 |
| 5,133,038 | 7/1992 | Zipper | 385/139 |

FOREIGN PATENT DOCUMENTS

| | | | |
|---|---|---|---|
| 0182494 | 5/1986 | European Pat. Off. | 385/135 X |
| 0349344 | 1/1990 | European Pat. Off. | 385/139 X |
| 0350245 | 1/1990 | European Pat. Off. | 385/135 X |
| 0408266 | 1/1991 | European Pat. Off. | 385/135 X |
| 0368445 | 3/1991 | European Pat. Off. | 385/135 X |
| 8711970.6 | 11/1987 | Fed. Rep. of Germany | 385/135 X |
| WO85/04960 | 11/1985 | PCT Int'l Appl. | 385/135 X |

*Primary Examiner*—Brian Healy
*Attorney, Agent, or Firm*—Darby & Darby

[57] ABSTRACT

A termination system is provided for use with optical fibre members installed in tubular passageways using a flow of air or other gas. The system comprises a chamber defined by a body having an opening provided with a removable cover. An end of at least one passageway in which a first optical fibre member may be installed is terminated on the body so that the passageway communicates with the interior of the chamber. Means are mounted on the cover for terminating an end of at least one second optical fibre member. Preferably the passageway carries a plurality of first optical fibre members and the cover has means for terminating the ends of an equal plurality of the second optical fibre members.

15 Claims, 16 Drawing Sheets

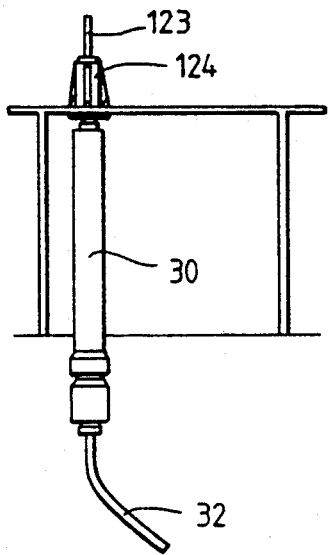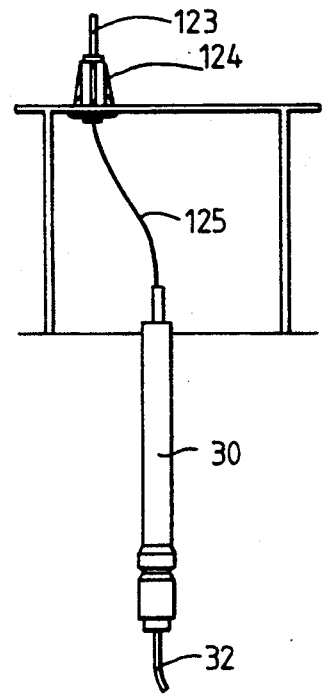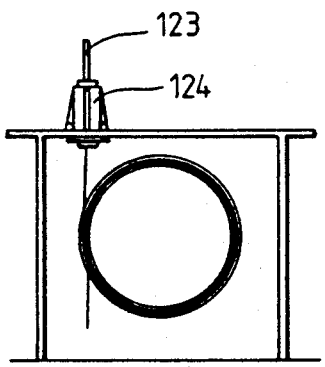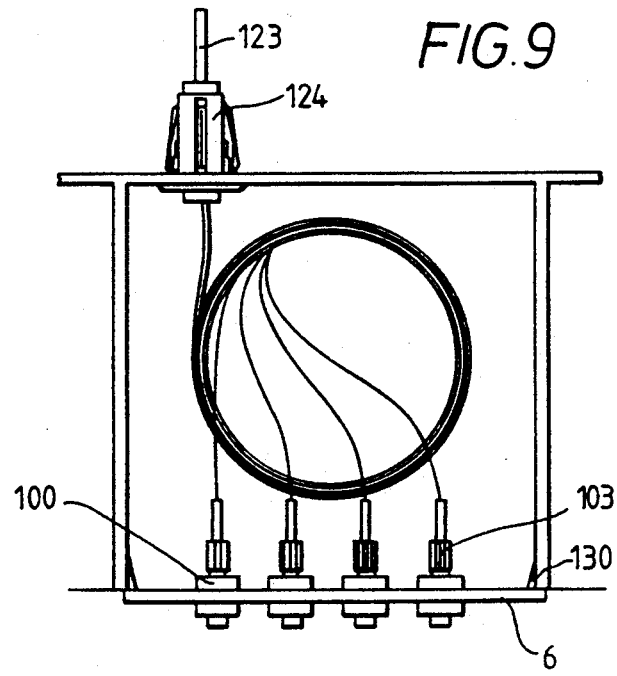

TERMINATION SYSTEM FOR OPTICAL FIBRES

BACKGROUND OF THE INVENTION

This invention relates to a termination system for use with optical fibres, and in particular with optical fibres which have been installed in a tubular passageway using a flow of air or other gas. A method of installing an optical fibre in this way is known, for example, from EP-A-0108590. EP-A-0108590 uses an air flow which is blown along this tubular passageway, and for convenience the method is referred to below as blowing, though it should be mentioned that it has been proposed elsewhere to use sucking instead of, or in addition to, blowing, and the system of the present invention is equally applicable if sucking is used.

A common way of attaching modern communications equipment to incoming and outgoing cables at network hubs (e.g. equipment rooms), is via patch leads and a patch panel. These patch facilities are similar in concept to old fashioned operator controlled telephone exchanges. A patch arrangement provides organised and easily traceable terminations. The connections can also be reconfigured, so affording a simple method of line switching. This is particularly suitable for high bandwidth systems, wherein other switching techniques may prove unreliable and expensive.

A popular way of housing communication devices, such as opto-electronic line drivers, at network hubs, is via rack style equipment cabinets. Patch panels for use with metallic and optical cables have been developed for use in equipment cabinets. These are particularly favoured, because they allow standard cabinet sizes to be used for cable terminations and communications equipment. This assists and simplifies room layout.

Simple optical patch panels are essentially the same as those intended for use with metallic cables. A typical known optical patch panel is shown in FIG. 1 and comprises an array of optical connector coupling sleeves 100 mounted on a support plate 101. The panel can be easily incorporated into network cabinets, via the vertical support rails of the cabinet. The design enables optical cables 102 containing a single optical fibre and each terminated with a male optical connector 103, to be linked by the coupling sleeve. FIG. 2 shows a side view of such an arrangement.

Simple optical patch panels have been produced for a variety of different types of optical connector. They have also been produced for twin fibre cables terminated with a duplex optical connector.

The use of coupling sleeves to align two male connectors, rather than male/female pairs, results from the need to polish the end of the fibre during the termination operation. This ensures a good optical connection through the coupling. Female connectors would prove awkward to polish and are not normally produced.

Patch panels are often used to terminate and patch multifibre cables. With the possible exception of twin fibre cables, multifibre varieties generally require a modified patch panel design. This is to allow organisation of the fibres contained within the cable which assists termination. A further requirement of patch panels used for terminating and patching multifibre cables, is to allow the storage of coils of excess fibre. These excess lengths allow several termination attempts on each fibre within the cable. This avoids the need to interfere with fibres already terminated with optical connectors, for example in the event of a fibre breaking when attaching a connector. Without the coils of excess fibre this would require more of the cable sheath to be removed to reveal more of the broken fibre. This could result in damage to those fibres already terminated.

Patch panels intended for use with multifibre cables provide a means of fibre storage and organisation on one side of the connector coupler support panel. The other side is unchanged and allows attachment of single or perhaps twin fibre patch leads or multi-way patch leads. These are used to link the terminated fibres of the multifibre cable to optoelectronic equipment in the usual way. FIG. 3a shows a simple termination and patching module 105 for use with multifibre cables. This comprises a casing 106 having a base 107 on which the fibre is coiled and a front plate 108 on which there are coupling sleeves 109.

Termination of fibres with optical connectors, involves stripping the outer protective coatings of the fibre, gluing the exposed glass into a connector ferrule (an accurately bored metal or ceramic tube), assembling the remainder of the connector around the ferrule and finally polishing the tip of the fibre and ferrule to produce a transparent fibre/air boundary. Optical connectors are often attached to the fibres at installation sites. Field termination, as this technique is termed, is messy, time consuming and can result in poor terminations. This is due to dusty and dirty installation environments often encountered at installation sites.

An alternative is to splice connector pigtails to the cabled fibres, for example by fusion welding techniques. Fusion welding involves melting the free ends of the pigtails, each of which comprises an optical connector pre-terminated onto a short length of fibre, to the cabled fibre, using one of the many portable proprietary fusion welding machines available. This technique has the advantage of allowing the messy connector attachment and polishing to be carried out in a controlled factory environment. This contributes to the provision of consistent and reliable terminations. However, if this technique is used additional storage space is required for the pig-tailed fibre. Termination and patch modules for multifibre cables are ideally suited to termination of fibres using the pigtail technique.

FIG. 3b shows the module 105 used with optical fibres having pigtails 111. The fusion splice protectors 110 shown in the FIG. 3 each comprise a short heat shrinkable tube containing a metal pin. This affords protection to the mechanically weak splice.

Modifications which can be made to the basic termination and patch module, include the provision of individual fibre storage cassettes for the coils and excess fibre and fibre pigtails. These improve organisation of the fibres within the module and are particularly useful when terminating cables containing many fibres With conventional optical cables, once the fibres have been terminated within a module, there is generally no requirement to gain access to the fibre storage area. One possible reason for access would be to repair a damaged fibre. However such damage is extremely unlikely as the fibres are well protected. Termination modules are therefore often installed in a rigid stack, the terminations in each module being completed and the module securely fastened before the next module is put into place above. This approach makes future access to the storage compartment difficult in the unlikely event of a repair being necessary but does produce a compact termination cabinet.

Such inaccessible terminations would be useless for blown fibre systems, since after optical fibres have been installed in tubular passageways by blowing, it may be necessary at a later time to regain access to the ends of the tubular passageways, which are typically in the form of flexible plastics tubes. One reason for requiring access is that initially the system may have spare tubes, i.e. more tubes than are required to carry the number of optical fibres which are initially needed. At a later date, as and when additional fibres are needed, these may be installed in the spare tubes, and this requires access to the ends of the tubes. Secondly, it may sometimes be necessary to remove fibres from tubes, for example to allow replacement fibres to be installed, and removal, like installation, is carried out by blowing. This too, requires access to the ends of the tubes.

Our European Patent Application published as EP-A-0408266 describes a termination system which permits the access referred to above, without needing to interfere with the operation of other optical fibres connected through the termination system. To this end, the termination employs modules each of which slides between a first position in which the module is enclosed in the housing and a second position in which the module extends from the housing to allow access to the interior of the module, each module being provided with means for terminating an end of at least one passageway in which an optical fibre may be installed and means for terminating an end of at least one further optical fibre member.

However, although the termination system described in EP-A-0408266 has advantages compared to the prior art, the sliding mechanism it employs makes it quite expensive to manufacture. Also, it introduces an element of potential unreliability, because the blowing tubes have to move when the modules are moved, which could damage the tube.

SUMMARY OF THE INVENTION

Accordingly, it is an object of the present invention to provide a termination system which is simpler than that of EP-A-0408266 but which still retains some or all of its advantages.

According to one aspect of the present invention there is provided a termination system for use with optical fibre members installed in tubular passageways using a flow of air or other gas, comprising a chamber defined by a body having an opening provided with a removable cover, means mounted on the body for terminating an end of at least one passageway in which at least one first optical fibre member may be installed, so that the passageway communicates with the interior of the chamber, and means mounted on the cover for terminating an end of at least one second optical fibre member.

In a preferred embodiment of this aspect of the invention the said passageway carries a plurality of first optical fibre members and the cover has means for terminating the ends of an equal plurality of the said second optical fibre members.

According to another aspect of the invention there is provided a tool for use in installing an optical fibre member in a tubular passageway, comprising an elongate shaft having a longitudinal bore extending from a first end of the shaft to a second end of the shaft; means at the first end of the shaft for receiving a tubular member through which a fluid carrying an optical fibre member to be installed can enter the said bore; and an elongate sleeve surrounding the shaft with a portion of the shaft at the second end extending beyond the adjacent end of the sleeve, the sleeve being longitudinally movable with respect to the shaft.

BRIEF DESCRIPTION OF THE DRAWINGS

In the accompanying drawings:

FIG. 4b is a plan view on a larger scale of part of the module of FIG. 4a;

FIGS. 8a to 8c also show stages in the use of the tool of FIG. 6;

FIG. 9 is a view corresponding to FIG. 4b but showing a cover clipped to the front of a compartment, and a coil of fibre in the compartment;

DESCRIPTION OF THE PREFERRED EMBODIMENT

Figure 1:
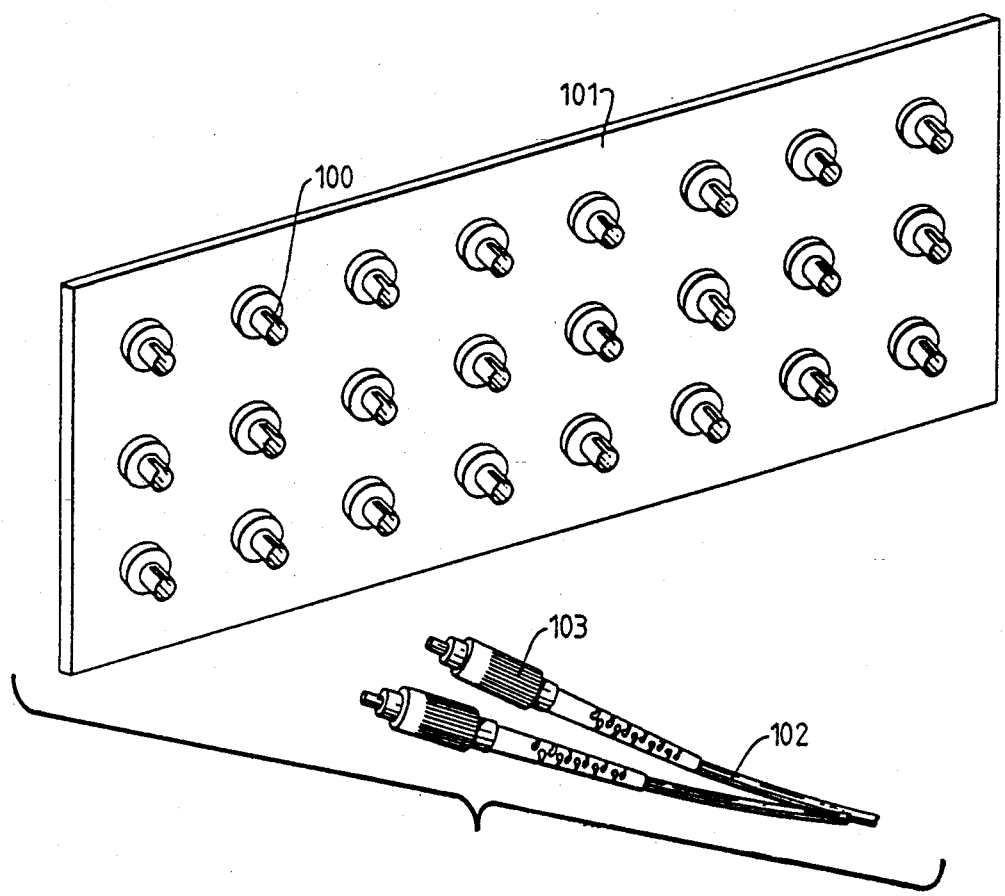
FIG. 1 is an isometric view of a known optical patch panel.
Figure 2:
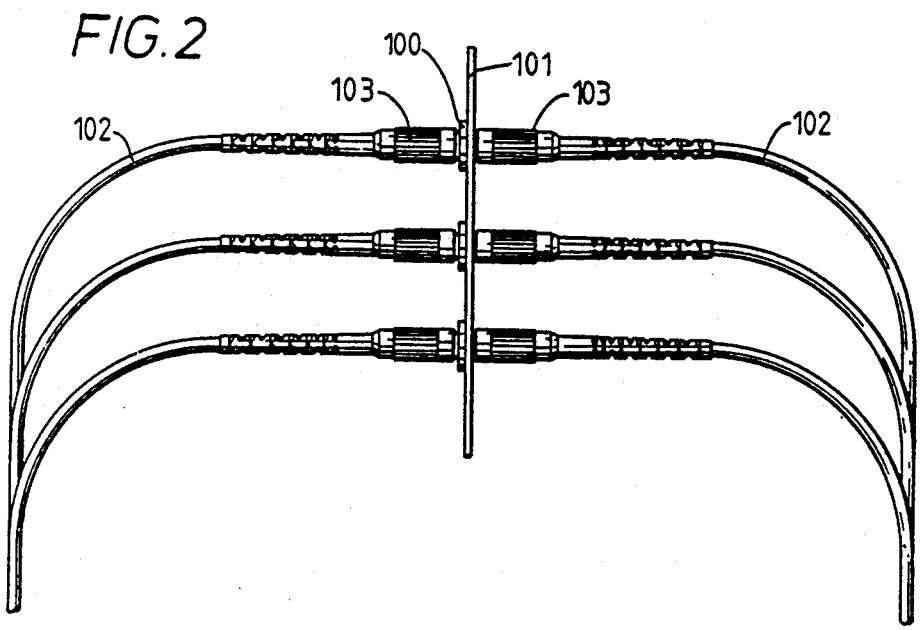
FIG. 2 is a side view of the panel of FIG. 1.
Figure 3A:
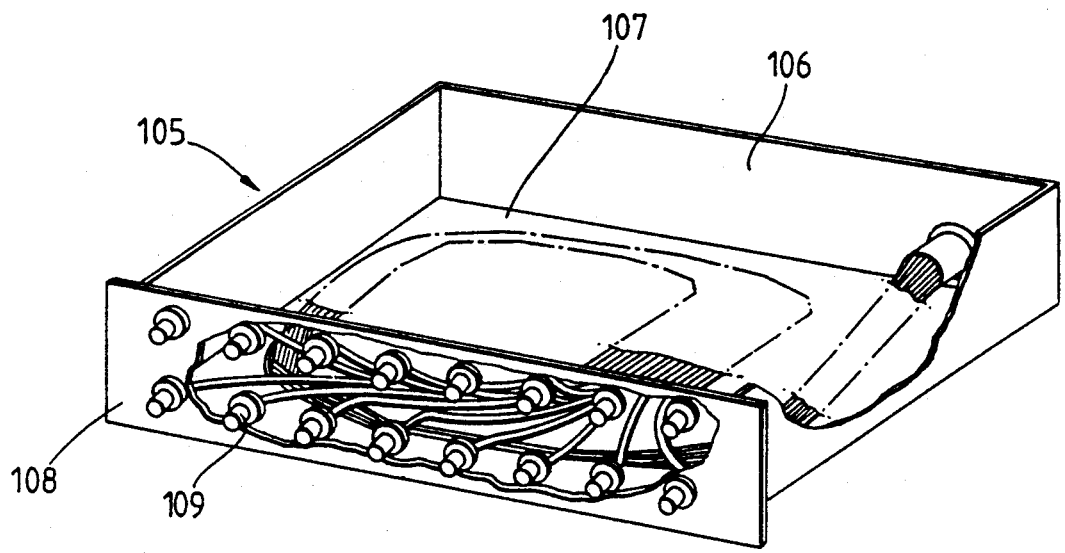
FIG. 3a is an isometric view of a known termination and patching module for use with multifibre cables.
Figure 3B:
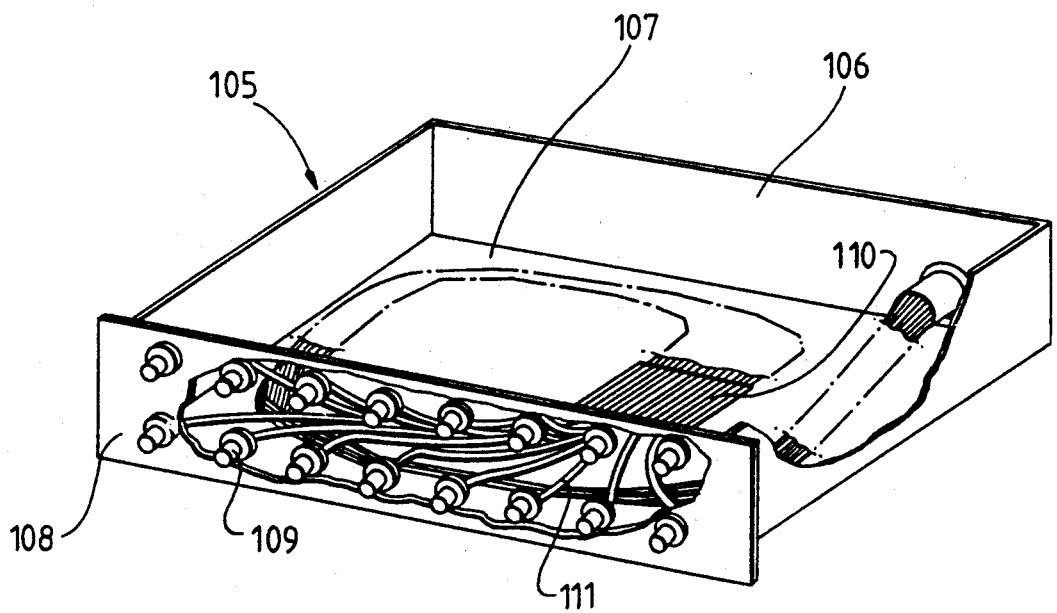
FIG. 3b is the same as FIG. 3a but shows the use of splices.
Figure 4A:
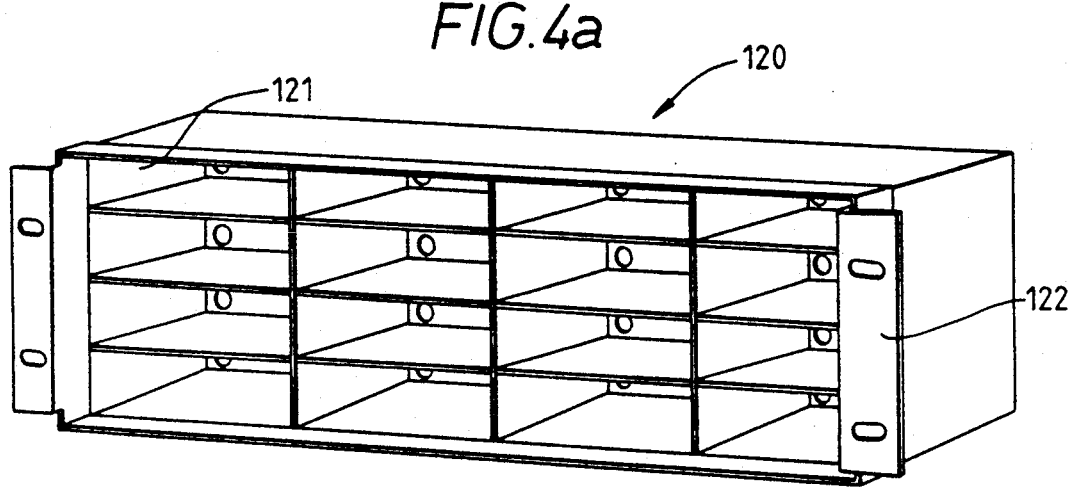
FIG. 4a is an isometric view of a termination module forming part of an embodiment of the invention.
Figure 4B:
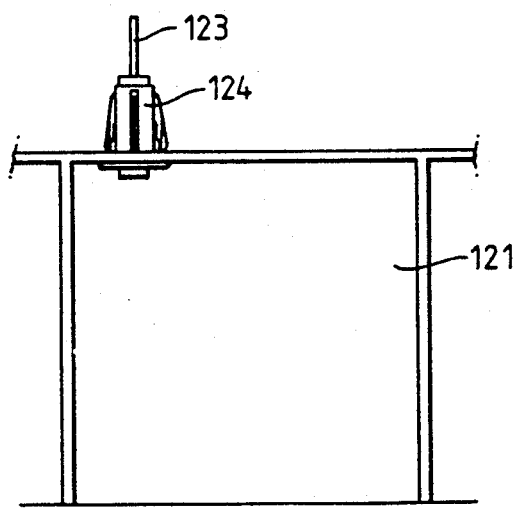

FIGS. 4a and 4b shows diagrammatically a termination module 120 constituting an embodiment of the present invention. The removable covers have been omitted from the drawing. The module 120 is subdivided into a series of compartments or pigeon-holes 121, of which there are sixteen in the drawing The module may be conveniently housed in a standard equipment cabinet, using screwable fixings, via the vertical support rails of the cabinet and front mounting locations 122 of the module Each pigeon-hole 121 provides a separate storage compartment for optical fibres installed in a respective blowing tube 123. At the rear of the compartment, a push fit tube connector 124 is provided to allow attachment of blowing tubes and for the attachment of a special blowing wand. This is used during fibre blowing operations and is described further.

The connector 124 shown is a 'snap-in' design which allows quick module assembly. Alternative connector types can of course be used, for example designs with provision for bayonet style connection of the blowing wand, or designs moulded into the module during manufacture.

Once the termination module 120 is mounted in a cabinet or other supporting frame, the first operation is to connect the blowing tubes 123 to the rear of the unit via the push fit connectors 124. Once attached, further access to these tubes is not required, and additional modules may therefore be built up in a rigid stack, in a similar fashion to the termination and patch modules discussed above FIG. 5 shows in more detail part of one practical form of unit which can be used to make up a termination system according to the invention. The unit provides four of the "pigeon-holes" referred to above, and so to provide a sixteen pigeon-hole module as FIG. 4 is, four such units would be needed. The pigeon-holes have curved rear walls, which is convenient as regards accommodating a fibre coil.

Figure 5:
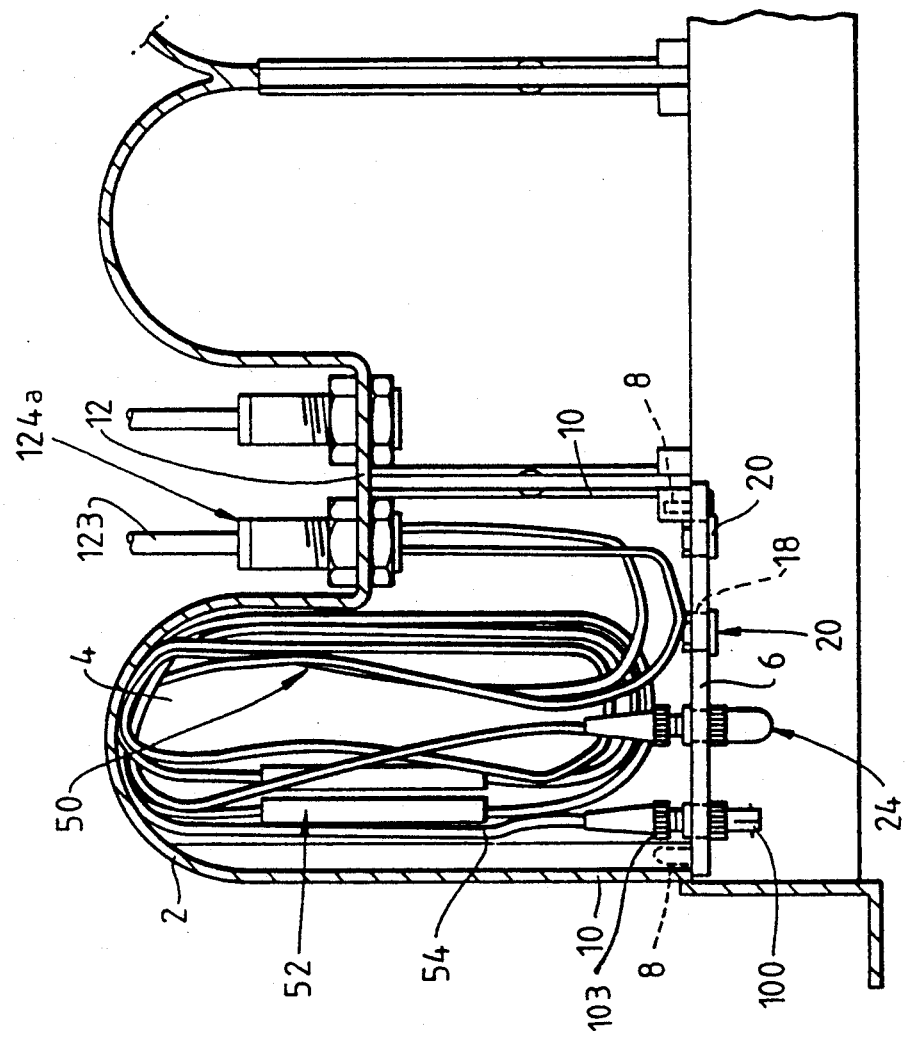
FIG. 5 is a plan view, in more detail, of one form of unit which can be used to make up a termination system according to the invention.
Figure 6:
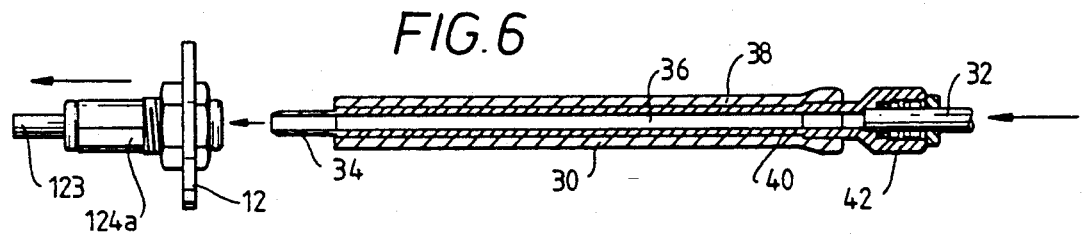
FIG. 6 shows a tool, illustrated in longitudinal section, about to be used to insert an optical fibre member into the termination system according to the invention.

The unit shown in FIG. 5 comprises two halves which are mirror images of one another, and only a small fragment of the second half is illustrated. Each of these halves is in turn composed of two sections, which are mirror images of one another, and only the left hand one of these two sections is shown in full. This section, or pigeon-hole, will now be described in detail, and it will be understood that what is said applies equally to each of the other three sections which make up the complete unit.

The unit has an outer casing 2 which may be conveniently moulded from a rigid plastics material. The interior of the unit is sub-divided into four chambers 4 one for each of the four sections. Each chamber has an opening at the front which is closed by a cover 6. The cover 6 is removably secured to the housing 2, for example by means of screws 8. Alternatively, however, the cover may be clipped into place in the opening, and may, for example, be provided with resilient clips adapted to bear against the side walls 10 and thereby hold the cover in place simply by means of friction.

The rear wall 12 of the housing is provided with a connector 124a which receives an end of the tube 123 in which optical fibres are to be installed. The connector 124a could be a push fit connector of the same type as connector 124 shown in FIG. 4b, though what is illustrated is a connector 124a having the same function as the connector 124 but held in place by screwthreaded nuts. The connector 124a is hollow and is aligned with an opening (not shown) in the wall 12, so that the interior of the tube 123 communicates with the interior of the chamber 4.

The cover 6 is provided with four apertures 18. Any of the apertures which are not required for use at a particular time can be closed by blanking plugs 20, as is shown in the case of the two right hand apertures.

Those in use each receive a coupling sleeve 100. One of these is shown with a dust cap 24 on it.

The way in which the unit just described can be used is as follows. Suppose the tube 123 initially contains no optical fibres, and it is desired to install fibres therein which terminate in the unit. The left hand portion of the unit shown in FIG. 5 illustrates the situation where such fibres have already been installed, and for the purpose of visualising the starting condition for the installation operation one must imagine that the illustrated fibres are not there.

The first step is to remove the cover 6 to obtain access to the chamber 4. A blowing device is then connected to the connector 124a via an elongate wand 30 which is shown in detail in FIGS. 6 and 7a to 7c, and which is described in more detail below with reference to those Figures. Such a wand is used because the distance between the top and bottom walls of the unit may be too small to permit direct manual access to the connector 124a. This is particularly the case where a high density termination system is to be achieved.

FIGS. 8a to 8c show diagrammatically successive steps during the fibre blowing procedure. The blowing wand, which is attached to blowing equipment via a short length of flexible tube 32, is first attached to the push fit connector (here shown as push-fit conntor 124) at the rear of a storage pigeon-hole (FIG. 8a), as already mentioned. Fibres are then blown into the tube 123 attached to the rear of the termination module, from the blowing equipment, via the flexible tube 32 and blowing wand 30. Once the fibre has been installed, the blowing wand is detached from the rear tube connector and a short tail of fibre 125 allowed to form (FIG. 8b). Finally the fibre tail is cut and the fibres coiled and placed temporarily in the pigeon-hole (FIG. 8c) ready for optical connectors to be attached.

Figure 7A:
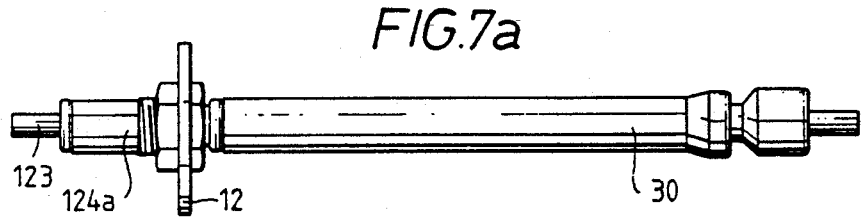
FIGS. 7a to 7c show successive stages in that insertion operation.

FIGS. 6 and 7a to 7c show one possible design of blowing wand for use with push fit connectors, and the operation thereof. Other designs to allow use with bayonet style connectors for example may be used instead. The upstream end of the wand 30 is connected to the blowing device via the flexible tube 32 along which travels an optical fibre member carried by a current of air or other gas. The downstream end of the wand 30 terminates in a reduced diameter portion 34 which is inserted in the opening in the connector 124a. With the wand connected as shown in FIG. 7a, an optical fibre can be blown from the blowing head through the tube 32, through the passage 36 which extends longitudinally of the wand 30, through the connector 124a and into the tube 123.

Figure 7B:
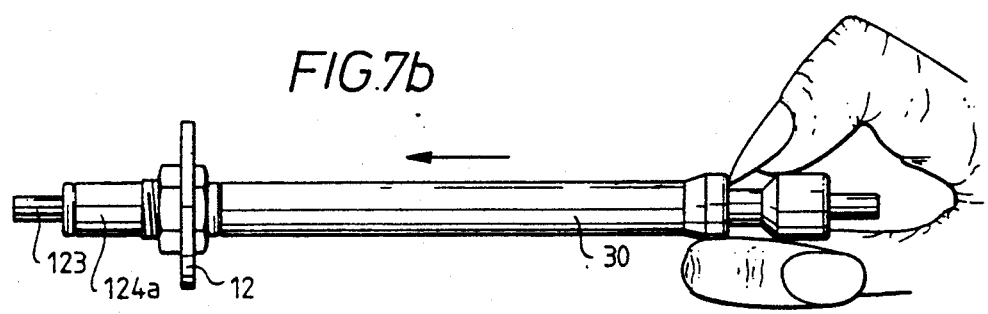
Figure 7C:
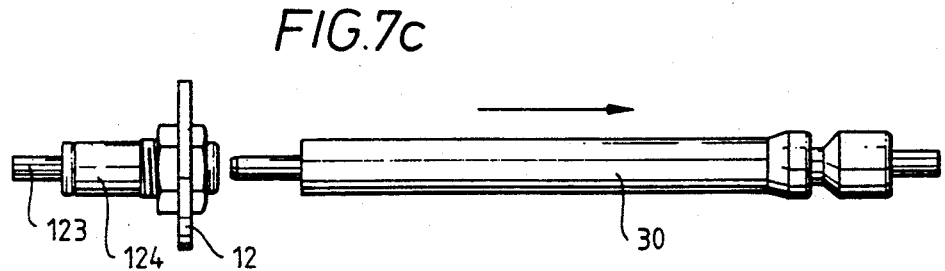

The wand 36 comprises an outer sleeve 38 which is longitudinally slidable with respect to an inner tube 40. The reduced diameter portion 34 and a stock portion 42 which receives the tube 32 ar both fast with the inner tube 40. When blowing has been completed the sleeve 38 is caused to slide forwardly with respect to the inner tube 40, as shown in FIG. 7b. This exerts a force on the connector 124a which causes it to disengage the reduced diameter portion 34 and permit that portion to be withdrawn as shown in FIG. 7c. Further details of a suitable connector can be found in EP-A-349344.

After the fibre tails 125 have been coiled up a connector 103 may then be attached to the fibre ends. Alternatively, as shown in FIG. 5, the ends are connected by splices contained in splice protectors 52 to ruggedised pigtail fibre tails 54, with the ends of the pigtail fibres 54 being provided with the connectors 103.

In either case the necessary equipment (polishing table, fusion welding machine etc) is placed at a convenient height in front of the module, using a suitable stand or alternatively a shelf attached to the front support rails of the equipment cabinet The fibres previously installed are then uncoiled, the ends taken to the termination equipment and the optical connectors attached. The tail of fibre formed during the blowing operation therefore allows the connectors to be attached at a convenient operator height and allows several attempts at connection Once the fibres have been terminated with optical connectors, the fibres are coiled, together with any connector pigtail fibre and placed into the storage pigeon-hole. The attached optical connectors are positioned to the front of the compartment.

Finally, with the fibres coiled, the cover 6 with optical connector coupling sleeves attached is presented to the front of the pigeon-hole. Each of the optical connectors is then attached to one of the coupling sleeves 100 which is already attached to the cover 6 The cover is then secured to the housing 2 by screws as shown in FIG. 5. FIG. 9 shows diagrammatically a modification in which spring clips 130 used instead of screws.

The drawings illustrate the use of single-way optical connectors. However, it will be appreciated that different types of optical connectors, including duplex and multi-way connectors, could also be used.

Assistance can be provided during the fibre coiling procedure by the use of a simple tray. The tray is first placed at the entrance to the fibre storage compartment and the fibres are coiled onto its upper surface. The tray and fibre coil are then pushed into the storage compartment. The tray can be removed if required by simply holding the coil of fibre with the finger tip and sliding the tray out from underneath.

Figure 10:
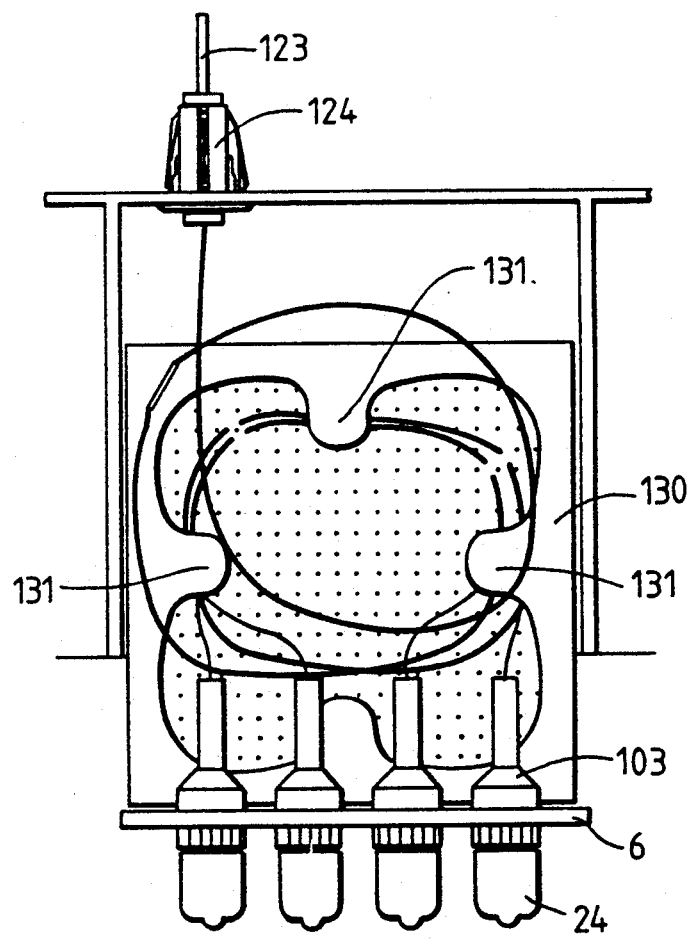
FIG. 10 is a plan view showing the use of a coil-holding tray.

Alternatively, as shown in FIG. 10, a tray 130 can be formed from an extension to the rear of the cover 6. In this case the fibres are coiled onto the tray, the optical connectors 103 attached to the connector couplers and the whole assembly pushed into the storage compartment. The tray 130 is preferably provided with a plurality of lugs 131 to hold the fibre coil in place.

With the covers 6 in position, the termination unit functions as, and has the appearance of, a conventional optical patch panel.

Figure 11:
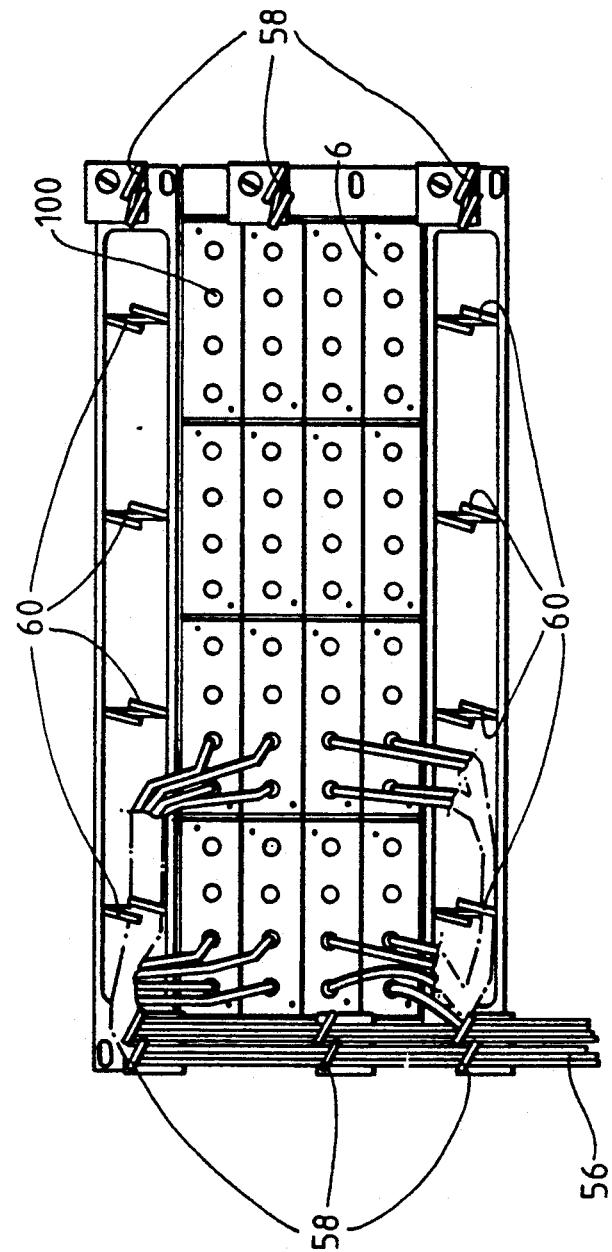
FIG. 11 is a front elevation of an embodiment of a termination system according to the invention.

FIG. 11 shows a termination system having four of the units described above, with external connections made to some of the coupling sleeves 100. FIG. 11 shows patch leads 56 within which are optical fibres. Such an optical patch lead is a ruggedised optical cable with optical connectors at each end, which is used to connect optical or opto-electronic equipment to the termination system, the lead being demountable. A single optical fibre is led to each of the coupling sleeves 100 where it is in optical alignment with a respective one of the fibres connected to the rear of the covers 6. It will be seen that the module shown in FIG. 11 has a vertical line of patch lead organisers 58 on either side thereof, and a horizontal line of patch lead organisers 60 at the top and bottom thereof. These organisers 58, 60 are in the form of rings or hoops, and guide the patch leads 56 and help to ensure that the leads leading to one of the covers interfere as little as possible with the other covers.

Figure 12:
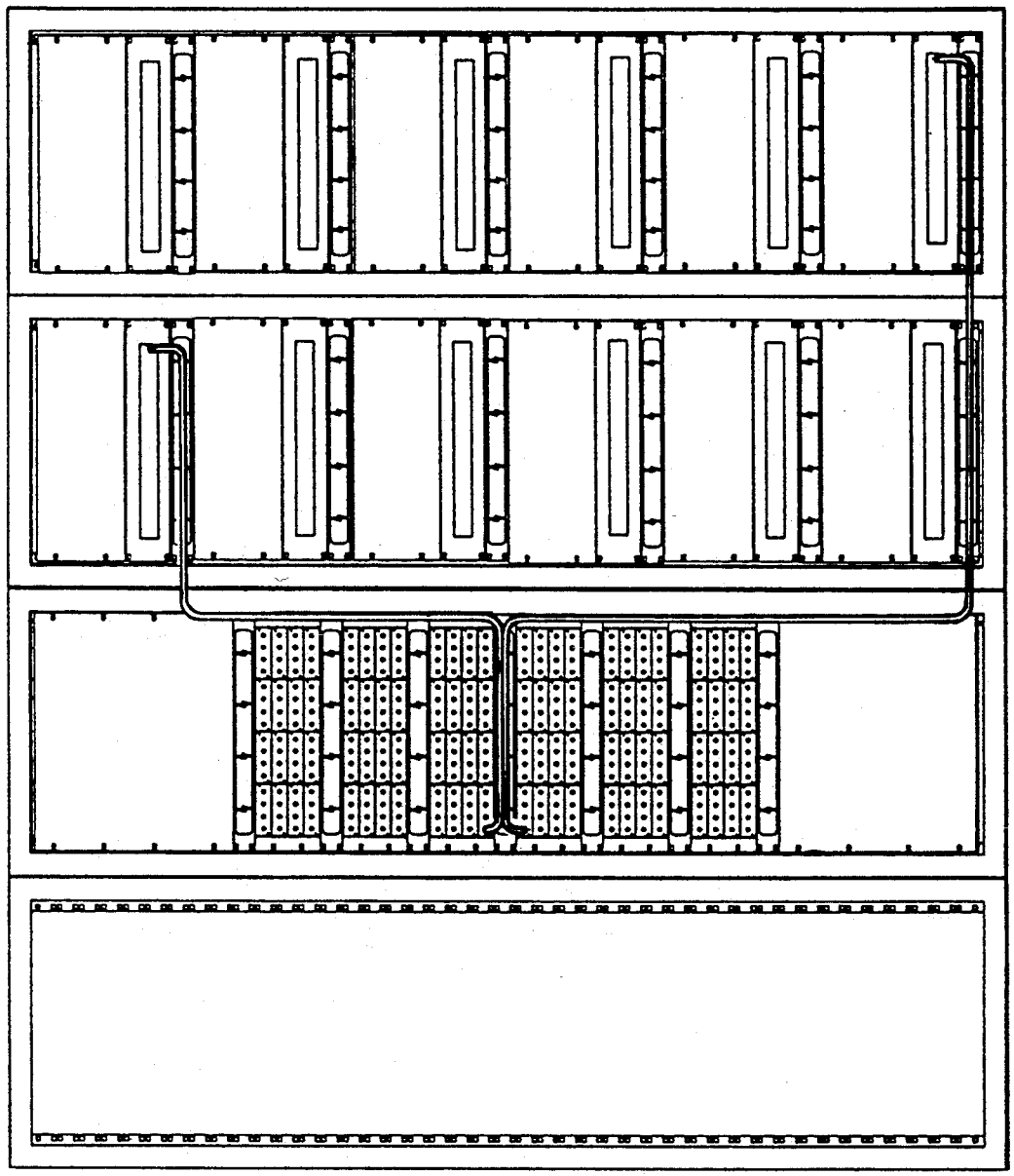
FIG. 12 is a front elevation of four cabinets in one of which is mounted a termination system according to the invention.

FIG. 12 shows six of the modules of FIG. 11 mounted in a cabinet, with other items of equipment also being mounted in adjacent cabinets. By way of example, FIG. 12 shows connections being provided between two of these other items of equipment and, the termination system of the present invention. It will be understood that from the termination system connections can be provided, as in FIG. 12, to items of equipment arranged in adjacent cabinets, or the same cabinet, or to items of equipment located elsewhere. Also, connections can be provided between coupling sleeves within a given module or between a coupling sleeve in one module and a coupling sleeve in another module, for example in order to provide a ring connection arrangement.

The termination system described above has several advantages when compared with other systems.

Firstly the pigeon hole termination module can be manufactured as a one piece unit, for example by moulding techniques, and is therefore very cost effective.

Secondly, since the blowing tubes are rigidly fixed, there is little chance of damage, as could be caused by a sliding mechanism.

Furthermore, a significant feature of the termination system described herein is that optical fibres can be inserted into one of the tubes 123 (or indeed blown out of one of the tubes 123 if they have previously been inserted and are no longer required) with little if any disturbance being caused to fibres installed in other tubes. This is because all the fibres terminating on any one of the covers 6 originates from the same tube 123.

Once the termination system is installed, fibre blowing and patching operations can be carried out from the front of the system, without any need for rear or side access. This means that units can be placed in cabinets positioned against walls or in rows etc. The termination modules may also be installed back to back in equipment cabinets to provide an extremely compact termination system. It will be understood that in order to do this the tubes 123 must all be connected to their respective connectors 124 before the modules are installed, since after installation access to the reverse sides of the modules is not possible.

The drawings illustrate a system in which u to four fibres and connectors are installed in each pigeon-hole. Storage compartments which allow different numbers of fibres and connectors could of course be designed.

In the drawings the compartments are shown as being rectangular in front elevation, with their longer sides horizontal. Alternatively the compartments could be disposed with their longer sides vertical. In that case the coils are preferably sufficiently rigid to lie vertically in the compartments. If not, additional support can be provided by vertically oriented fibre storage trays.

A satisfactory design of patch panel termination system, must include provision for the organisation of individual patch leads, and as already mentioned the system shown in FIG. 11 uses simple supporting rings or hoops (58, 60) positioned to the side or above and below individual panels for this purpose. However, the result achieved is not entirely satisfactory, and it is desirable to provide an improved arrangement.

Patching systems designed for use with metallic cables, often make use of spiral coiled patch leads, similar in appearance to standard telephone receiver leads. These allow the required range of patch lead lengths to be kept to a minimum, as the leads can stretch to fit a range of different length routes. However, spiral optical patch leads are not normally produced, as the tight spiral would result in severe optical attenuation.

The problem therefore remains as to how to neatly organise any slack which is left in a standard length lead when configuring a particular patch. This difficulty could be overcome by using bespoke leads, precisely tailored in length to each patch requirement. This would be expensive and lead to the need for replacement leads when reconfiguring a patch.

Figure 13B:
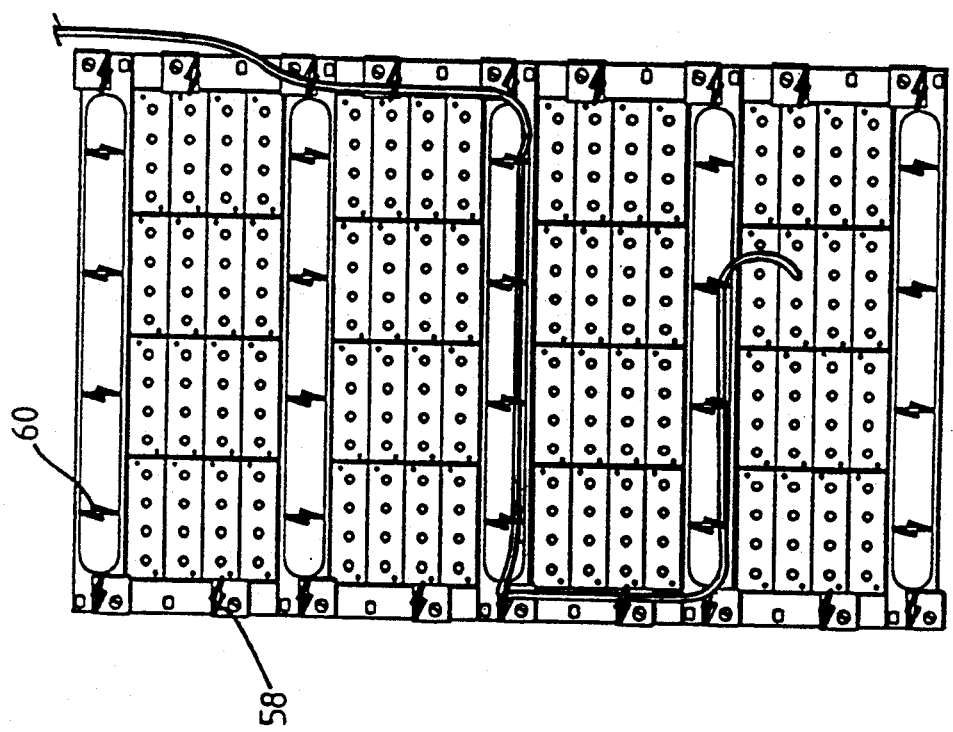
FIGS. 13a and 13b are front elevations of a system according to the invention, and showing organisation of the patch leads.
Figure 13A:
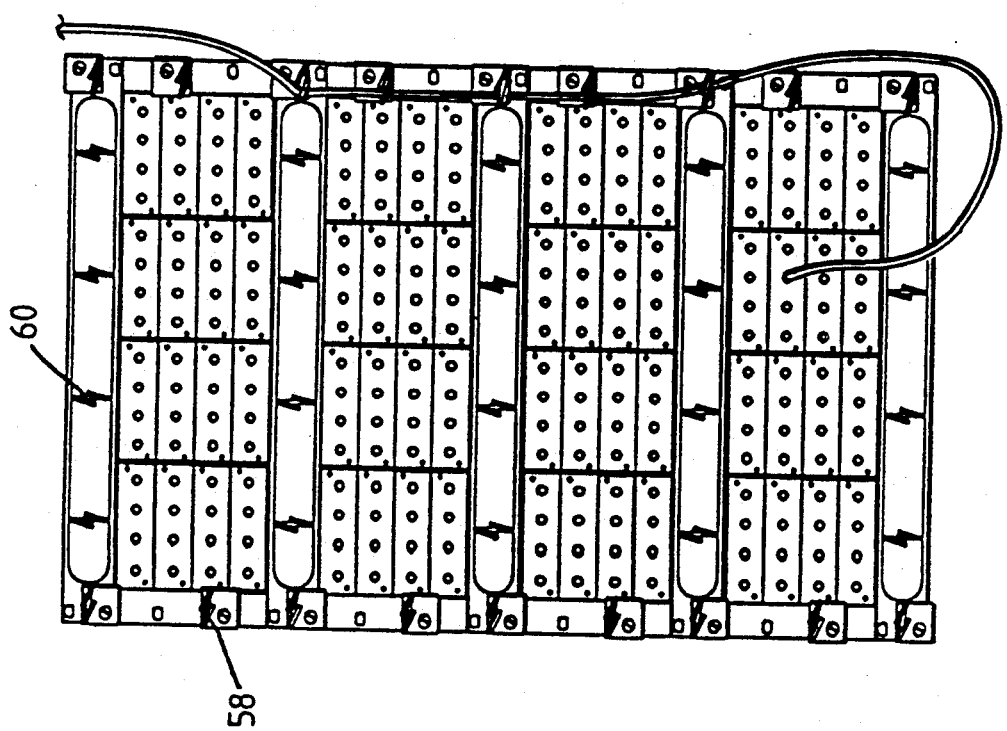

One solution would be to wind the lead around a combination of organiser hooks to lose any excess length (see FIGS. 13a and 13b. However, this can be time consuming, produces an untidy arrangement and makes subsequent removal of the lead difficult when repatching.

According to a further aspect of the invention there is provided a termination system in which at least one patch lead tray is provided to hold excess lengths of patch leads. This provides a simple but effective patch lead organiser.

Figure 20A:
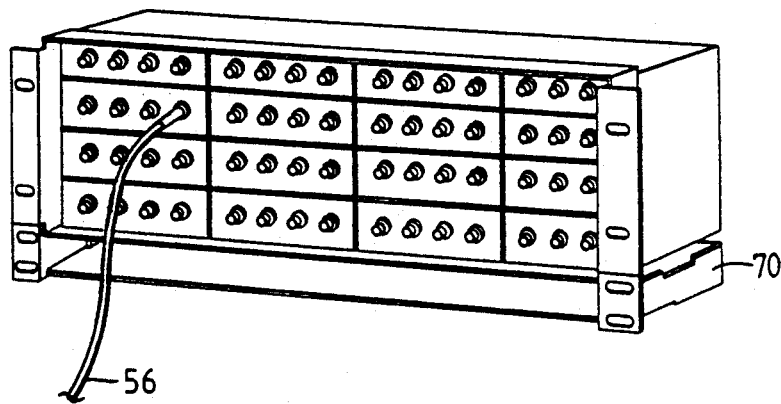
FIGS. 20a to 20c show successive steps in the use of the patch lead tray shown in FIGS. 14 to 19.
Figure 20B:
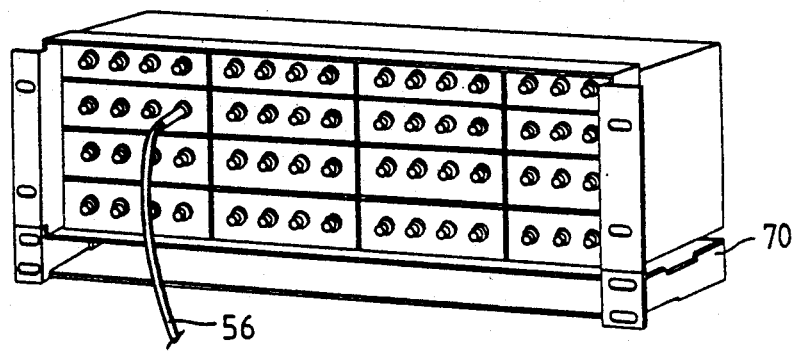
Figure 20C:
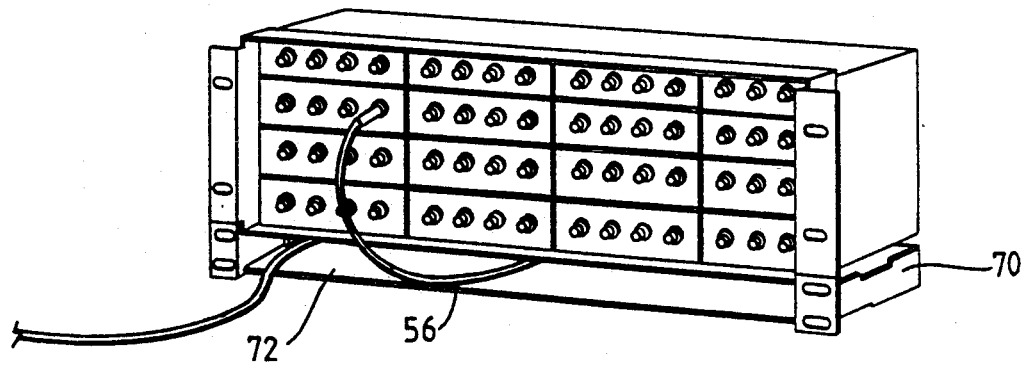
Figure 21:
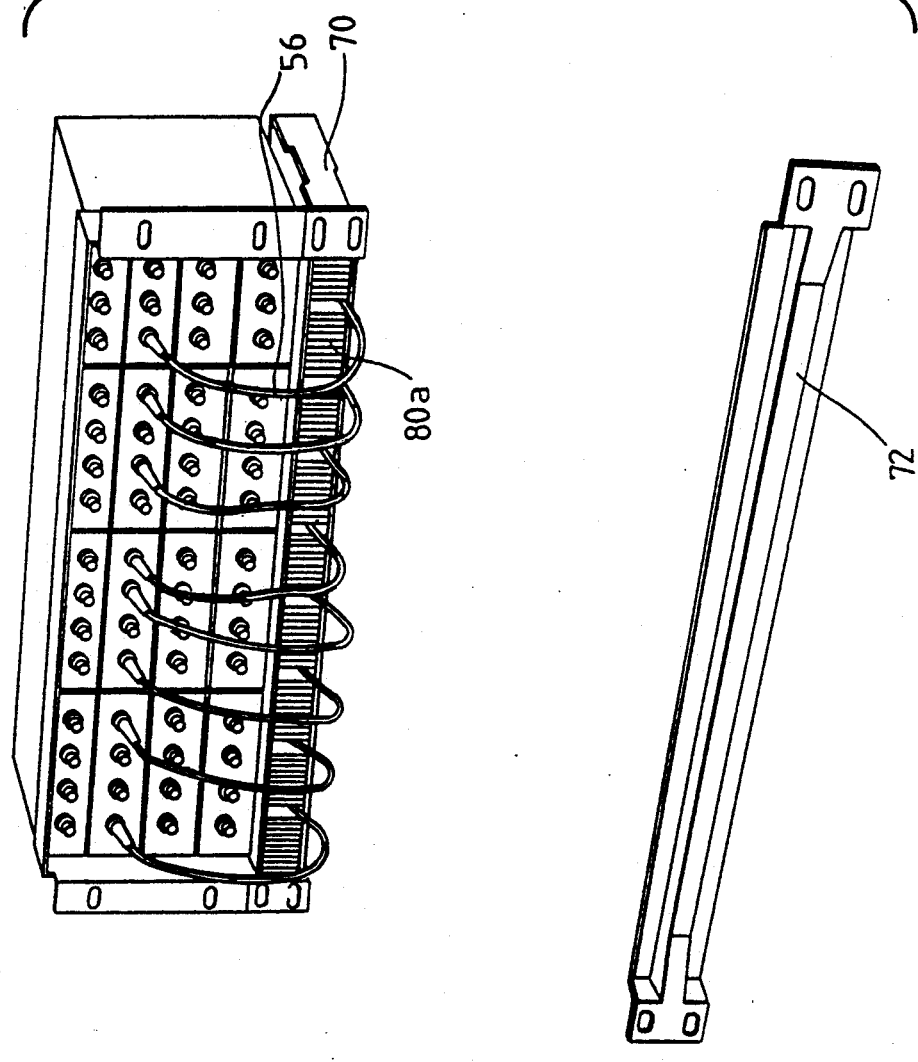
FIG. 21 is an exploded view of a modified form of the construction shown in FIGS. 14 to 19.

FIGS. 14 to 19 and 20a to 20c show a first embodiment of a termination module corresponding substantially to that shown in FIG. 5 and 11 but with a patch lead tray rather than rings or hoops 58, 60, and FIG. 21 shows a second embodiment. The patch lead tray is denoted by reference numeral 70 and is provided at the bottom of the module. The tray is the same width as the module. The tray is open at the front and has a cover strip 72 removably secured thereto by an arrangement comprising four nuts 74, each with a bolt 76 and a spacer 78. It should be appreciated that alternative arrangements for fastening the cover are possible, for example fixing by resilient clips.

Between the rear of the cover strip 72 and the front of the tray 70 are two strips 80, one behind the other edge portion of the cover strip and the other behind the lower edge portion of the cover strip. These strips can be made, for example, of a resilient foam plastics material. Whatever form they take they should be such that the patch leads can pass through them but be held thereby. In the case of foam strips, these may optionally be slotted for the purpose. The strips serve to hold the patch leads while they are being worked on.

When installing a patch lead, one end of the lead is first attached to the equipment, and the other end is then linked in the usual way to the required outlet on the patch panel. At this point any excess length of lead is formed into a coil and stored on the tray 70. To achieve this, the cover strip 72 is removed, the patch lead 56 is formed into a suitable coil, the coil is pushed into the tray through the open front thereof, and the cover strip 72 is then secured to the front of the tray. The successive steps are shown in FIGS. 20a to 20c.

Figure 14:
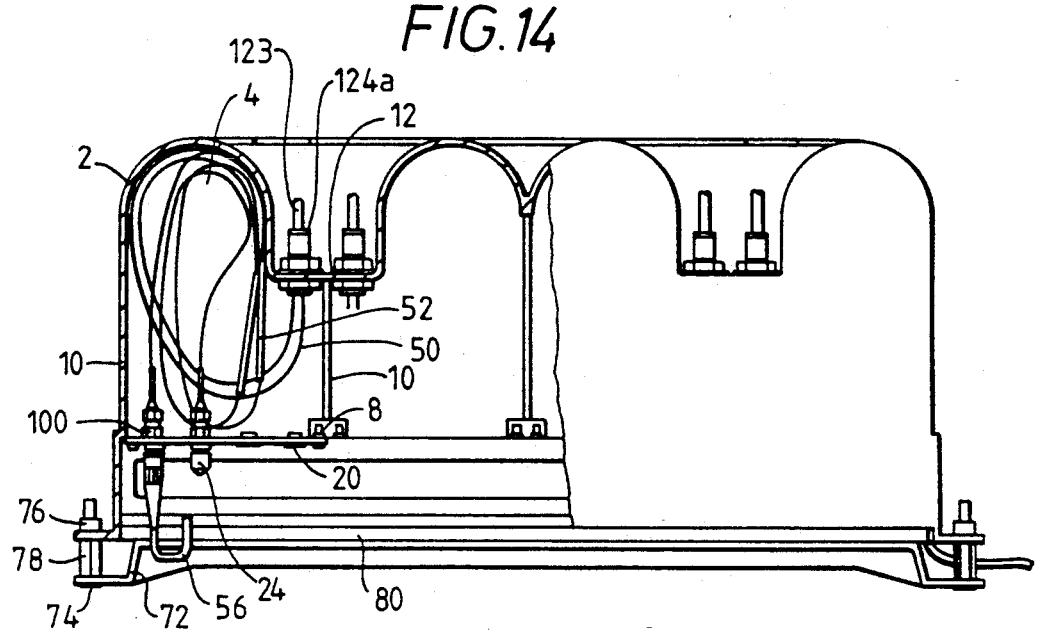
FIG. 14 is a view similar to that of FIG. 5 but showing the addition of a patch lead tray.
Figure 15:
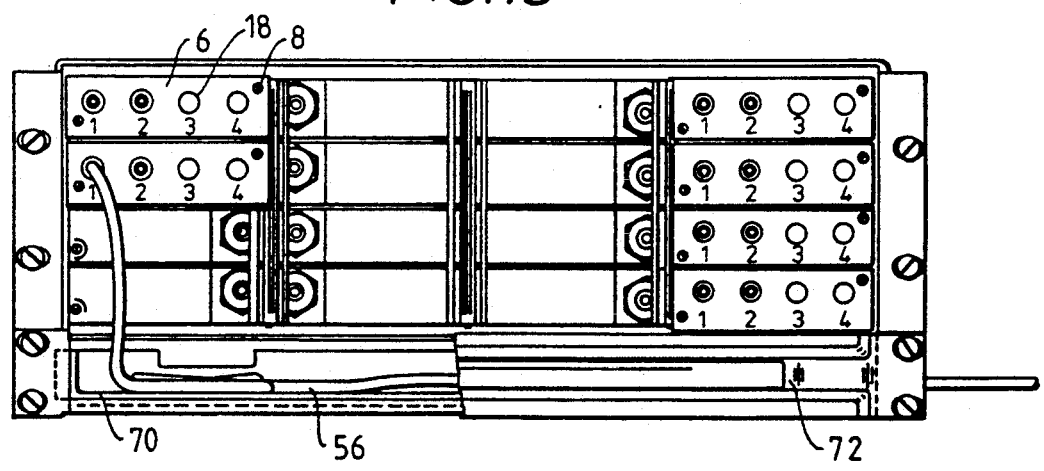
FIG. 15 is a front elevation of what is shown in FIG. 14.
Figure 16:
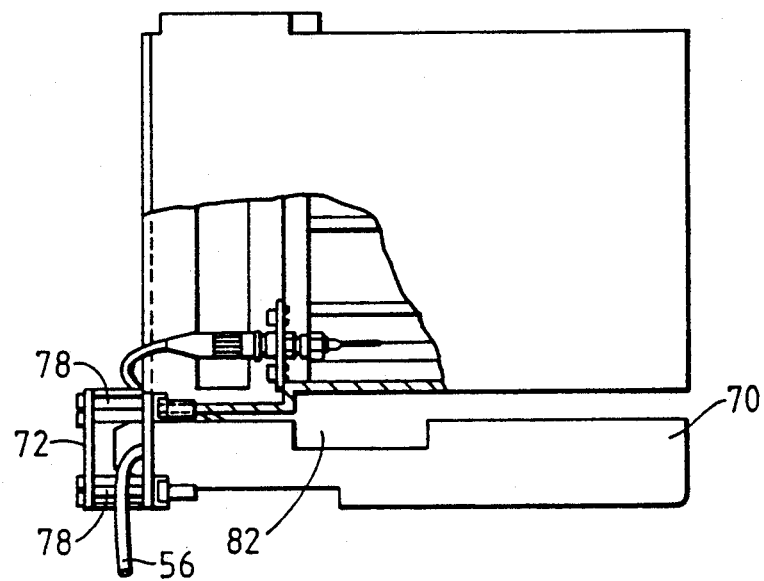
FIG. 16 is a side elevation of what is shown in FIG. 14.
Figure 17:
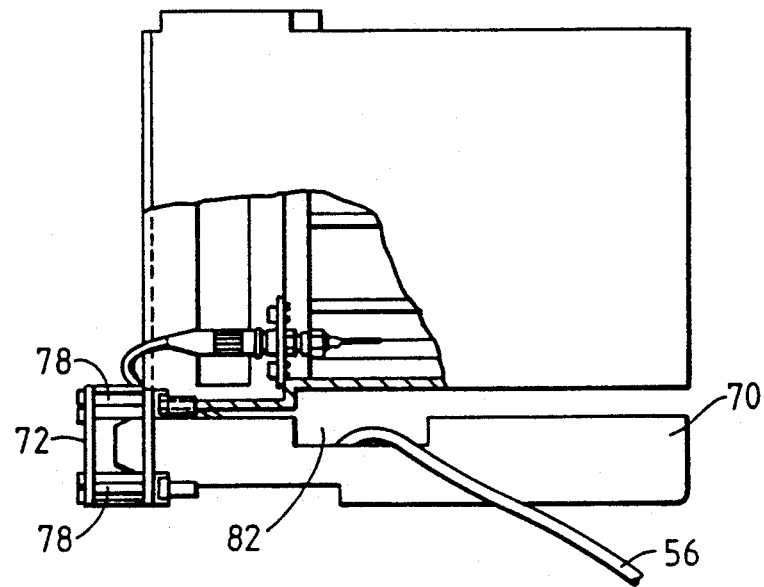
FIGS. 17 and 18 correspond to FIG. 16, but show alternative ways in which a patch lead may be arranged
Figure 18:
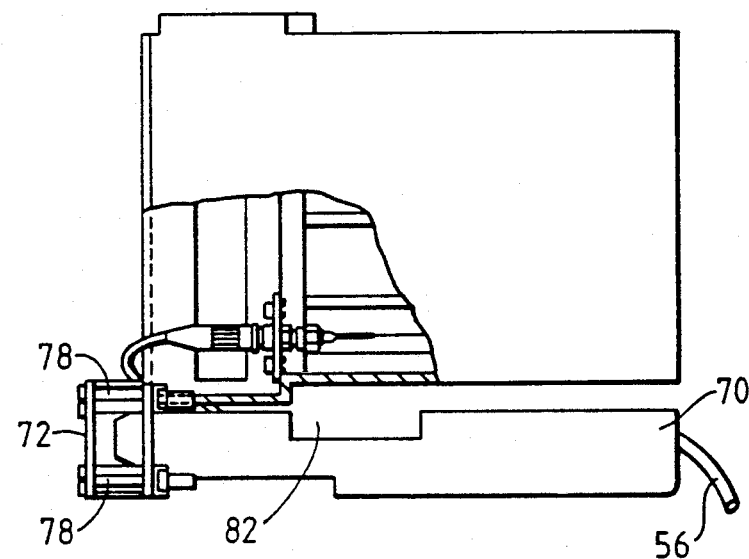

In FIGS. 14 to 16 the patch lead is shown exiting to the side, preparatory to travelling across the front of the adjacent unit on that side. However, various alternative arrangements are possible, and two of these are shown in FIGS. 17 and 18. In FIG. 17 the patch lead is shown exiting through a cut-out 82 provided in the upper edge of the side of the tray from where the patch lead can pass though a corresponding cut-out in the adjacent tray, to enter that adjacent tray. FIG. 18 shows the patch lead exiting via the rear of the tray, through a cut-out therein, from where it can pass across to the rear of the adjacent unit It will be appreciated that various other arrangements are possible FIG. 21 shows an embodiment in which the foam strips 80 are replaced by tufted brushes 80a. These are secured at their bases to a brush holder which is in turn secured to the tray.

The invention has been described above in relation to fibres installed by blowing However, the principles of the invention can also be employed in relation to fibres installed by other more conventional means. Thus, according to a further aspect of the invention there is provided a termination system for use with optical fibre members, comprising a chamber defined by a body having an opening provided with a removable cover, means for permitting an end portion of at least one first optical fibre member to enter the chamber, and means mounted on the cover for terminating an end of at least one second optical fibre member.

An embodiment of the invention can be visualised by regarding the element 123 as an optical fibre cable, and the element 124 as a means for gripping an optical fibre cable. This could be the same as the push fit connector which is described above as constituting element 124.

The invention has been described above in relation to a system in which patching is desired, to enable the system to be reconfigured However, the principles of the invention can also be employed in relation to systems in which no patching is required. Thus, according to yet another aspect of the invention there is provided a termination system for use with optical fibre members, comprising a chamber defined by a body having an opening provided with a removable cover, means for permitting an end portion of at least one first optical fibre member to enter the chamber, and means for permitting an end portion of at least one second optical fibre member to enter the chamber through the removable cover.

Figure 22:
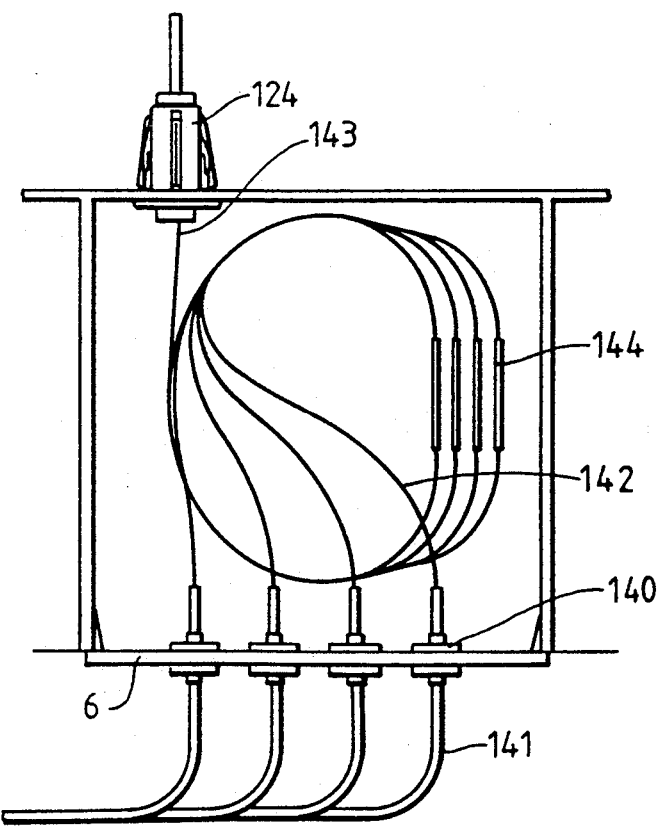
FIG. 22 is a view similar to FIG. 9 but showing another aspect of the invention.
Figure 19:
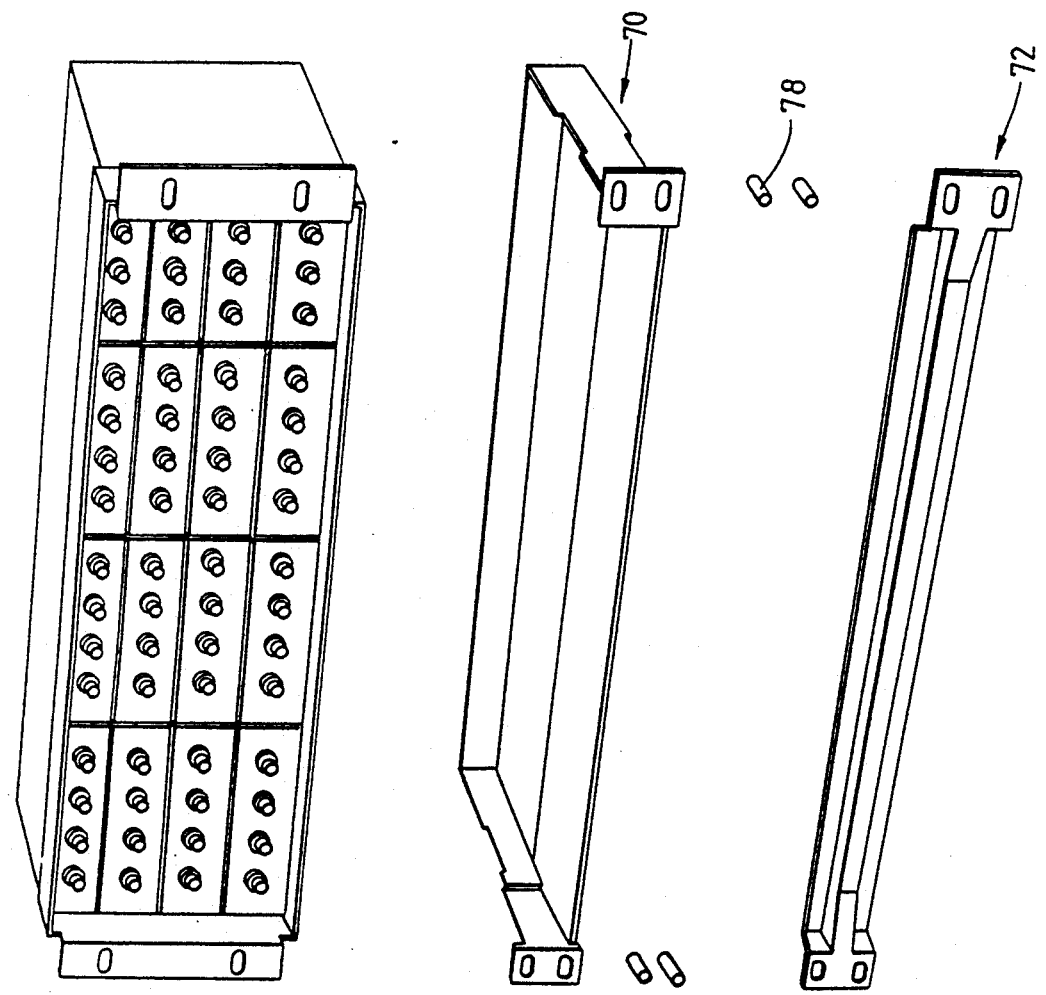
FIG. 19 is an exploded isometric view of the construction shown in FIGS. 14 to 18.

An embodiment of this aspect of the invention is shown in FIG. 22. Here the cover 6 is provided with a plurality of rubber grommets 140 or other suitable means for retaining respective ruggedised pigtails 141. These pigtails terminate in fibre end portions 142 which can be spliced to fibres 143 entering through the connector 124. The drawing shows splice protectors 144 covering the splices.

I claim:

1. A termination system for use with optical fibre members installed in tubular passageways using a flow of air or other gas, comprising a chamber defined by a body having a first opening provided with a removable cover, said cover having a rear face which faces an interior of the chamber and a front face which faces away from the chamber; means mounted on the body for terminating an end of at least one passageway in which at least one first optical fibre member may be installed, the body having at least one second opening through which said at least one passageway communicates with the interior of the chamber; first fibre terminating means mounted on the said rear face of the cover for terminating an end of said at least one first optical fibre member; and second fibre terminating means mounted on the front face of the cover for terminating an end of at least one second optical fibre member in optical communication with a respective said first optical fibre member, said chamber being substantially fully enclosed except for said first and second openings.

2. A system as claimed in claim 1, wherein the chamber has a rear wall portion in which is provided the means for terminating the said end of said passageway, and the opening provided with the removable cover is located at a front portion of the chamber.

3. A system as claimed in claim 1, wherein said means for terminating said end of said passageway serves to terminate a single passageway, said first and second fibre terminating means each serving to terminate a plurality of optical fibre members.

4. A system as claimed in claim 1, wherein the chamber has therein a fibre-receiving tray on which may be formed a coil of said at least one first fibre member.

5. A system as claimed in claim 1, comprising a plurality of said chambers forming a multi-chamber module.

6. A system as claimed in claim 5, comprising organiser means for holding excess lengths of said second optical fibre members.

7. A system as claimed in claim 6, wherein the said organiser means comprises a plurality of rings through which said second optical fibre members can pass, said rings being disposed adjacent the edges of said module.

8. A system as claimed in claim 6, wherein the said organiser means comprises an organiser tray disposed adjacent the said module, said tray being disposed to allow said second optical fibre members to pass to their terminations on the covers via the tray.

9. A system as claimed in claim 8, wherein the organiser tray has an entrance provided with fibre-engaging means.

10. A system as claimed in claim 9, wherein the fibre-engaging means comprises at least one tufted brush.

11. A system as claimed in claim 9, wherein the fibre-engaging means comprises at least one foam strip 12. A tool for use in installing an optical fibre member in a tubular passageway, comprising an elongate shaft having a longitudinal bore extending from a first end of the shaft to a second end of the shaft; means at the first end of the shaft for receiving a tubular member through which a fluid carrying an optical fibre member to be installed can enter the said bore; and an elongate sleeve surrounding the shaft with a portion of the shaft at the second end extending beyond the adjacent end of the sleeve, the sleeve being longitudinally movable with respect to the shaft.

13. A system as claimed in claim 5 wherein the modules are arranged adjacent one another in a rectangular array.

14. A termination system for use with optical fibre members installed in tubular passageways using a flow of air or other gas, comprising a chamber defined by a body having a first opening provided with a removable cover, the cover having a rear face which faces an interior of the chamber and a front face which faces away from the chamber; means mounted on the body for terminating an end of at least one passageway in which at least one first optical fibre member may be installed, the body having at least one second opening through which said at least one passageway communicates with the interior of the chamber; and at least one third opening in the cover to permit at least one second optical fibre member to pass therethrough into said chamber for connection with said at least one first optical fibre member, said chamber being substantially fully enclosed except for said first, second and third openings.

15. A system as claimed in claim 1, wherein the said first optical fibre member comprises a first portion installable in the passageway by blowing and a second portion within the chamber and optically connected to the said first portion.

* * * * *